United States Patent [19]

Maeda

[11] Patent Number: 5,335,035
[45] Date of Patent: Aug. 2, 1994

[54] VISUAL LINE DIRECTION DETECTING DEVICE FOR THE CAMERA

[75] Inventor: Yoshihiro Maeda, Hachioji, Japan

[73] Assignee: Olympus Optical Co., Ltd., Japan

[21] Appl. No.: 21,314

[22] Filed: Feb. 23, 1993

[30] Foreign Application Priority Data

Feb. 24, 1992 [JP] Japan ................... 4-036258

[51] Int. Cl.$^5$ ................ G03B 13/02; A61B 3/14
[52] U.S. Cl. ...................... 354/219; 354/222; 351/210
[58] Field of Search ............ 354/62, 219, 222, 224, 354/225; 351/210

[56] References Cited

U.S. PATENT DOCUMENTS

| | | | |
|---|---|---|---|
| 5,036,347 | 7/1991 | Tsunekawa et al. | 354/62 X |
| 5,150,143 | 9/1992 | Ohno et al. | 354/222 |

FOREIGN PATENT DOCUMENTS

| | | |
|---|---|---|
| 61-61135 | 3/1986 | Japan . |
| 63-94232 | 4/1988 | Japan . |
| 1190177 | 7/1989 | Japan . |
| 1241511 | 9/1989 | Japan . |
| 1277533 | 11/1989 | Japan . |
| 2-5 | 1/1990 | Japan . |

*Primary Examiner*—W. B. Perkey
*Attorney, Agent, or Firm*—Laff, Whitesel, Conte & Saret

[57] ABSTRACT

A visual line direction detecting device includes a finder optical system of a camera. A light-emitting means radiates light on the eyeball of the user through at least a portion of the finder optical system. A light-receiving means receives the light reflected by the eyeball of the user. A storage means stores an output from the light-receiving means, obtained when the user watches a predetermined position on the finder. A calculating means calculates the direction in which the user is looking in accordance with outputs from the storage means and the light-receiving means. A detecting means detects a change in the finder optical system. A correcting means corrects an output from the calculating means when a change in the finder optical system is detected by the detecting means after a storage operation in the storge means.

29 Claims, 10 Drawing Sheets

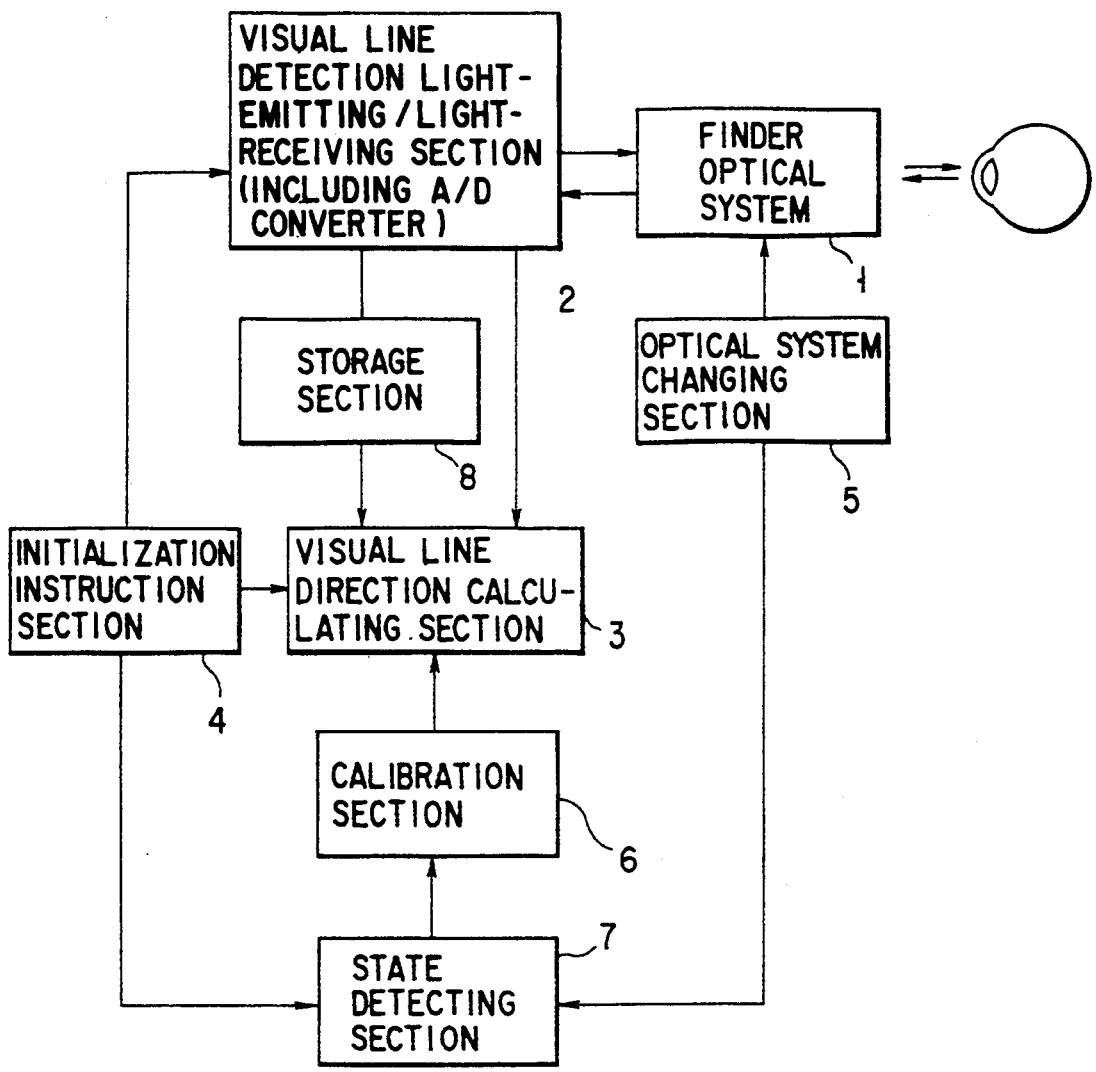
F I G. 1

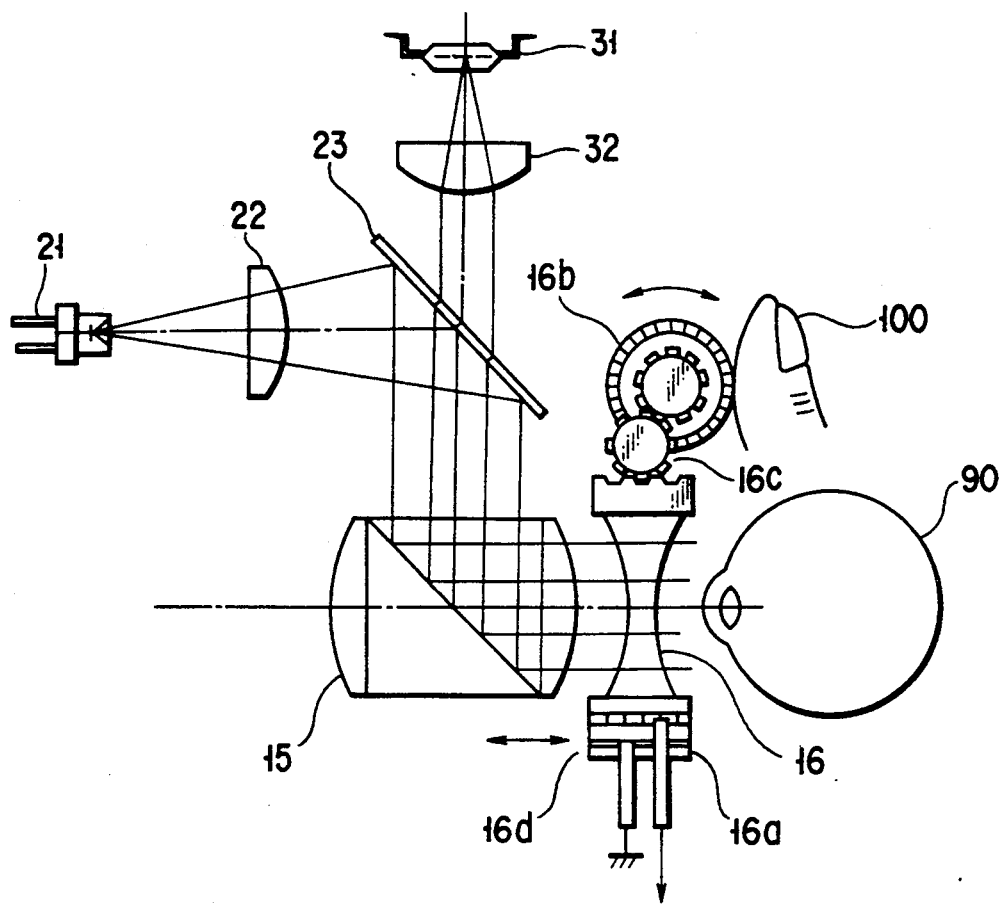
F I G. 3
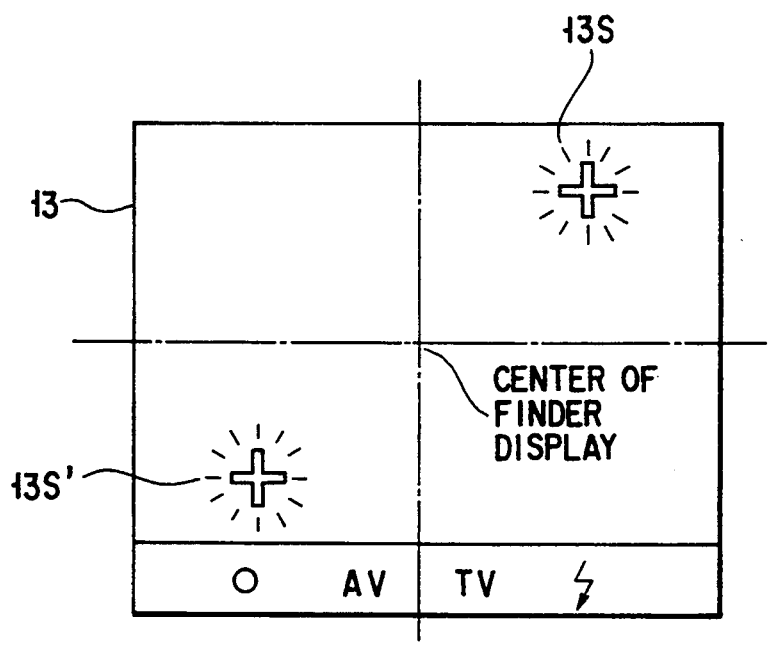
F I G. 4

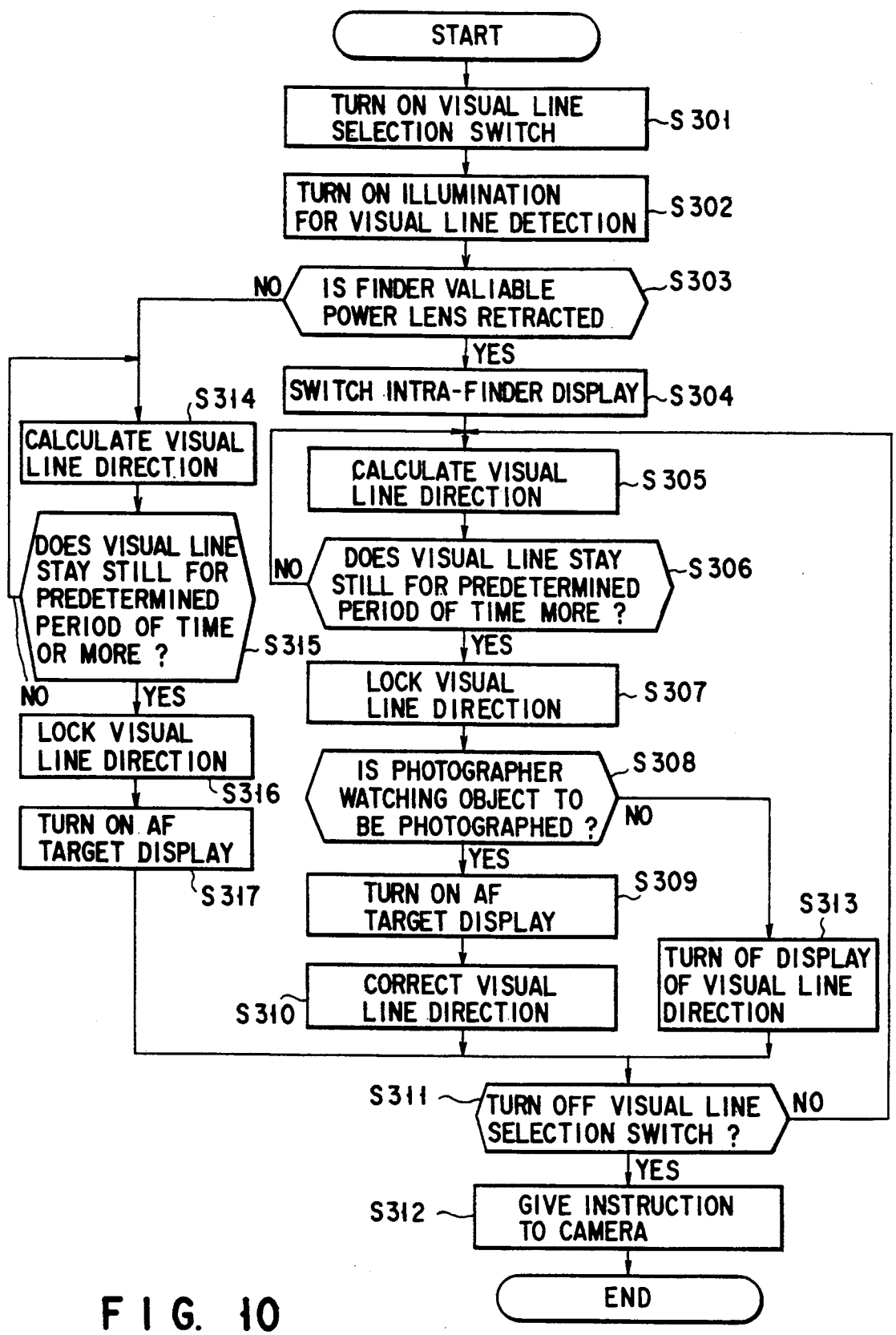
F I G. 10

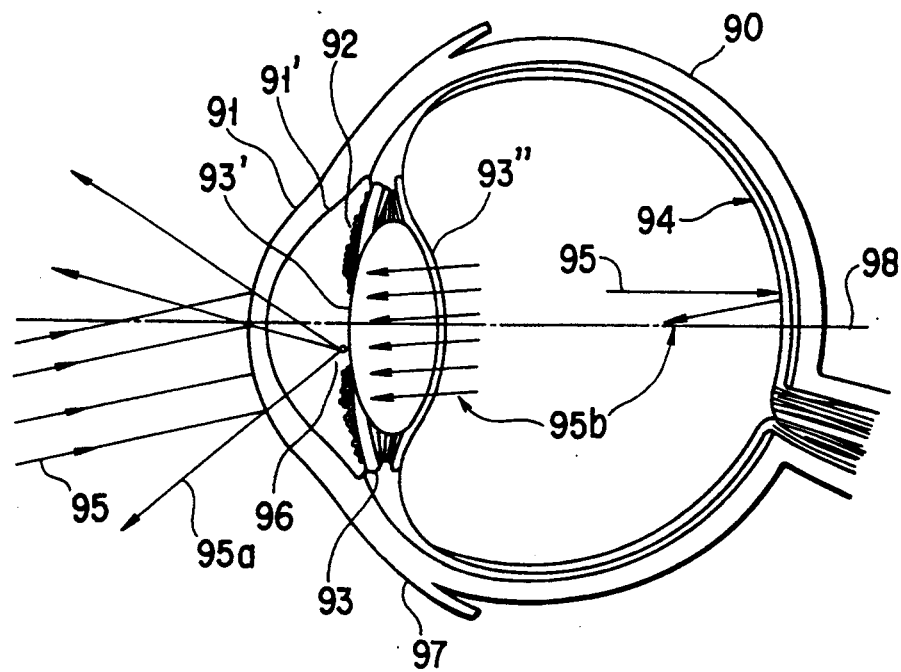
F I G. 11
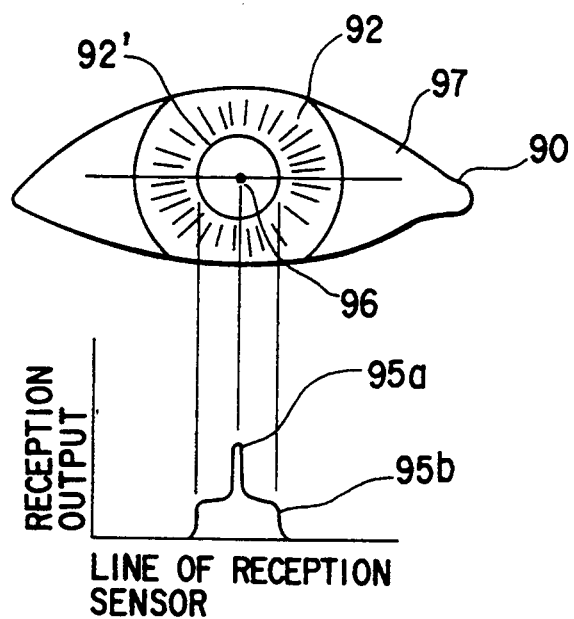
F I G. 12

VISUAL LINE DIRECTION DETECTING DEVICE FOR THE CAMERA

BACKGROUND OF THE INVENTION

1. Field of the Invention

The present invention relates to a device of a camera for detecting the direction in which the user is looking and, more particularly, a visual line direction detecting device which can be applied to a camera designed to perform automatic focus/exposure control by using detected visual line direction information.

2. Description of the Related Art

Information such as distance measurement or photometric information is input to a conventional camera by operating a dial, a button, or the like. In general, however, as the amount of information to be input is increased, an input operation tends to be complicated. For this reason, a method has been proposed, in which the visual line direction of a user of a camera who is looking into the finder is detected, and instructions are given to the camera on the basis of the visual line direction information.

For example, in the technique associated with the automatic focus adjustment camera disclosed in Published Unexamined Japanese Patent Application No. 61-61135, even if a major object to be photographed, on which the camera is to be actually focused, is net located in the center of the finder, focus adjustment can be performed In accordance with the distance to the major object by detecting the visual line of the operator who is looking into the finder and automatically directing a detecting section to the major object to which the visual line of the operator is directed. According to this technique, therefore, focus adjustment with respect to a major object, on which the camera is to be actually focused, can be easily performed.

In the technique associated with the camera control device disclosed in Published Unexamined Japanese Patent Application No. 63-94232, the visual line direction of a user inside a finder is detected so that instructions from the user can be judged on the basis of the position information.

In addition, according to the technique associated with the automatic focusing (AF) device disclosed in Published Unexamined Japanese Patent Application No. 1-190177, a visual line direction inside the finder visual field frame of a camera is detected, and a predetermined range almost coinciding with the visual line direction is displayed on the finder visual field frame, thereby detecting the focal point of an object to be photographed inside the field of vision.

Furthermore, in Published unexamined Japanese Patent Application Nos. 1-241511 and 2-5, techniques of detecting the above-mentioned visual line direction are disclosed.

Moreover, according to the technique associated with the visual line direction detecting device for a camera, disclosed in, e.g., Published Unexamined Japanese Patent Application No. 2-5, the light-receiving section of the device is constituted by a one-dimensional line sensor, and the processing circuit includes a splitting means for splitting an output from the one-dimensional line sensor into a fundus reflected light output component corresponding to reflected light from the fundus, and an output component corresponding to reflected light forming a first Purkinje image. The processing circuit obtains the position of the center of gravity of the split fundus reflected light component and that of the output component corresponding to the reflected light forming the first Purkinje image, respectively, thereby detecting the visual line direction of the eye.

In the above-described conventional techniques, when an optical system for performing visual line direction detection is to applied to a camera, the visual line direction detecting optical system is arranged in a split optical path in a finder optical system.

FIG. 14 shows the basic arrangement of a conventional visual line direction detecting device for performing visual line direction detection in a single-lens reflex camera.

As shown in FIG. 14, a quick return mirror 11 is disposed on the optical path of light passing through a photographic lens 10. A screen 12 and a finder liquid crystal display (LCD) 13 are arranged on the optical path of the light reflected by the quick return mirror 11. A pentaprism 14 is disposed on the optical path of the light passing through the screen 12 and the finder LCD 13. In addition, a prism 15 and an eyepiece 16 also serving as optical members for visual line direction detection are arranged on the optical path of the light reflected by the reflecting surface of the pentaprism 14.

A sub-mirror 80 is disposed on the optical path of the light transmitted through the quick return mirror 11. An AF sensor 81 is disposed on the optical path of the light reflected by the sub-mirror 80. An infrared light-emitting diode (LED) 21 and a light-emitting lens 22 are arranged as an illuminating section for visual line direction detection. Furthermore, a light-receiving sensor 31 and a light-receiving lens 32 are arranged as a light-receiving means for visual line direction detection.

Referring to FIG. 14, reference numerals 82 and 83 respectively denote a shutter and a portion (film rail surface) of the camera main body. A conventional camera generally has the above-described arrangement.

In this arrangement, light passing through the lens 10 is reflected by the quick return mirror 11. The reflected light is incident on the screen 12 and the finder LCD 13. The contents displayed by the LCD 13 can be superposed on an object to be photographed on the screen 12, The light passing through the screen 12 and the finder LCD 13 is reflected by the reflecting surface of the pentaprism 14. The reflected light is incident on the prism 15 and the eyepiece 16.

Meanwhile, the light transmitted through the quick return mirror 11 is reflected by the sub-mirror 80. The reflected light is then input to the AF sensor 81.

In this case, in order to perform visual line direction detection, an initialization input operation is generally performed to store the position of a reflected image on the light-receiving sensor 31, formed when the user looks into a predetermined intra-finder display, and the visual line direction of the user is detected on the basis of the movement amount of the reflected image from the set position. Although not necessarily required, this operation is preferably performed because the optical characteristics of the eyeball vary from person to person, and the optical characteristics of the right and left eyes of each person differ from each other.

In the above-described conventional techniques, however, since the finder optical system and the visual line direction detecting optical system partly share the same components, the following problems are posed.

Some conventional cameras incorporate diopter adjustment mechanisms, each designed to move the eyepiece as part of the finder optical system in accordance with the diopter of the user, and some are designed to adjust the diopters of the cameras by inserting lenses with diopters into the eyepiece portion of the cameras. Of the cameras incorporating zoom lenses and having non-transistor transistor logic (TTL) finders, some cameras are designed to perform zooming operations of the finder optical systems upon interlocking with zooming operations of the photographic lenses. In the above-described cameras, if diopter adjustment is performed after the above-mentioned initialization input operation is performed, the optical relationship between the visual line direction detecting optical system and the user greatly varies, even though the optical relationship between the finder optical system and the user is adjusted. In addition, the same problems as described above is posed when the magnification of the finder optical system is changed.

FIGS. 15A and 15B show a change in the state of the above-described visual line direction detecting optical system.

More specifically, FIG. 15A shows a state in which the eyepiece 16 is at the initial position, e.g., the position corresponding to −1 diopter, and light from the LED 21 is radiated, as a beam of parallel rays, on an eyeball 90. In the state shown in FIG. 15A, the illuminating and light-receiving optical systems for visual line direction detection are arranged such that the light reflected by the eyeball 90 is focused on the light-receiving sensor 31. When the eyeball 90 rotates to change the visual line direction, the detection image on the light-receiving sensor 31 moves, and the visual line direction of the user is calculated by a visual line direction calculating section 5.

FIG. 15B shows a state in which the eyepiece 16 moves to a position corresponding to the diopter of the user, and light from the LED 21 is radiated, as divergent light, on the eyeball 90.

In the state shown in FIG. 15B, the focal length and magnification of the illuminating and light-receiving optical systems for visual line direction detection change from those set while the eyepiece 16 is at the initial position.

In this state, light reflected by the eyeball 90 is not focused on the light-receiving surface of the light-receiving sensor 31. In addition the movement amount of the reflected image differs from the state shown in FIG. 15A upon rotation of the eyeball 90 and a consequent change in the visual line direction.

FIG. 16 is a graph showing the relationship between the rotational angle of the eyeball 90 and the movement amount of the image on the light-receiving sensor 31. Referring to FIG. 16, characteristics represented by lines 90a and 90b correspond to FIGS. 15A and 15B, respectively. As shown in FIG. 16, the movement amount of the image on the light-receiving element differs with a change in the magnification of the visual line direction detecting optical system. As a result, a correct visual line direction detection result cannot be output. This is because, the amount and direction of change in magnification differ depending on a finder and a visual line direction detecting system employed. That is, since the light-emitting/light-receiving optical systems of the visual line direction detecting optical system are not maintained in a constant state, the state of the visual line direction detecting optical system changes every time the focal point or magnification of the finder optical system is changed. Consequently, visual line direction detection cannot be performed.

SUMMARY OF THE INVENTION

The present invention has been made to solve the above problems, and has as its object to provide a visual line direction detecting device for a camera, which can perform visual line direction detection in accordance with diopter adjustment after an initialization input operation, and a change in the magnification of a finder optical system.

In a visual line direction detecting device for a camera according to the present invention, illumination light is radiated from a visual line direction detecting means onto the eyeball of the user through at least a portion of a finder optical system, and the reflected light from the eyeball is received and subjected to photoelectric conversion. The visual line direction is calculated by a visual line direction calculating means on the basis of an output from the light-receiving means. When an initialization designating means designates setting/inputting of an initial visual line position as a reference for a calculation in the visual line direction calculating means, the optical system of the finder optical system is changed by an optical system changing means. The change amount or state of the finder optical system is detected by a state detecting means on the basis of outputs from an output from the optical system changing means after an initialization input operation performed by the initialization designating means. The calculation performed by the visual line direction calculating means is then corrected on the basis of an output from the state detecting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the arrangement of the first embodiment of the present invention;

FIG. 3 is a view showing the arrangement of an optical system for visual line direction detection in the first embodiment;

FIG. 4 is a view showing an intra-finder display;

FIG. 10 is a flow chart for explaining an operation of the second embodiment;

FIG. 11 is a view showing the structure of an eyeball 90;

FIG. 12 is a view showing a reflected image from the eyeball 90;

DETAILED DESCRIPTION OF THE PREFERRED EMBODIMENTS

Figure 2:
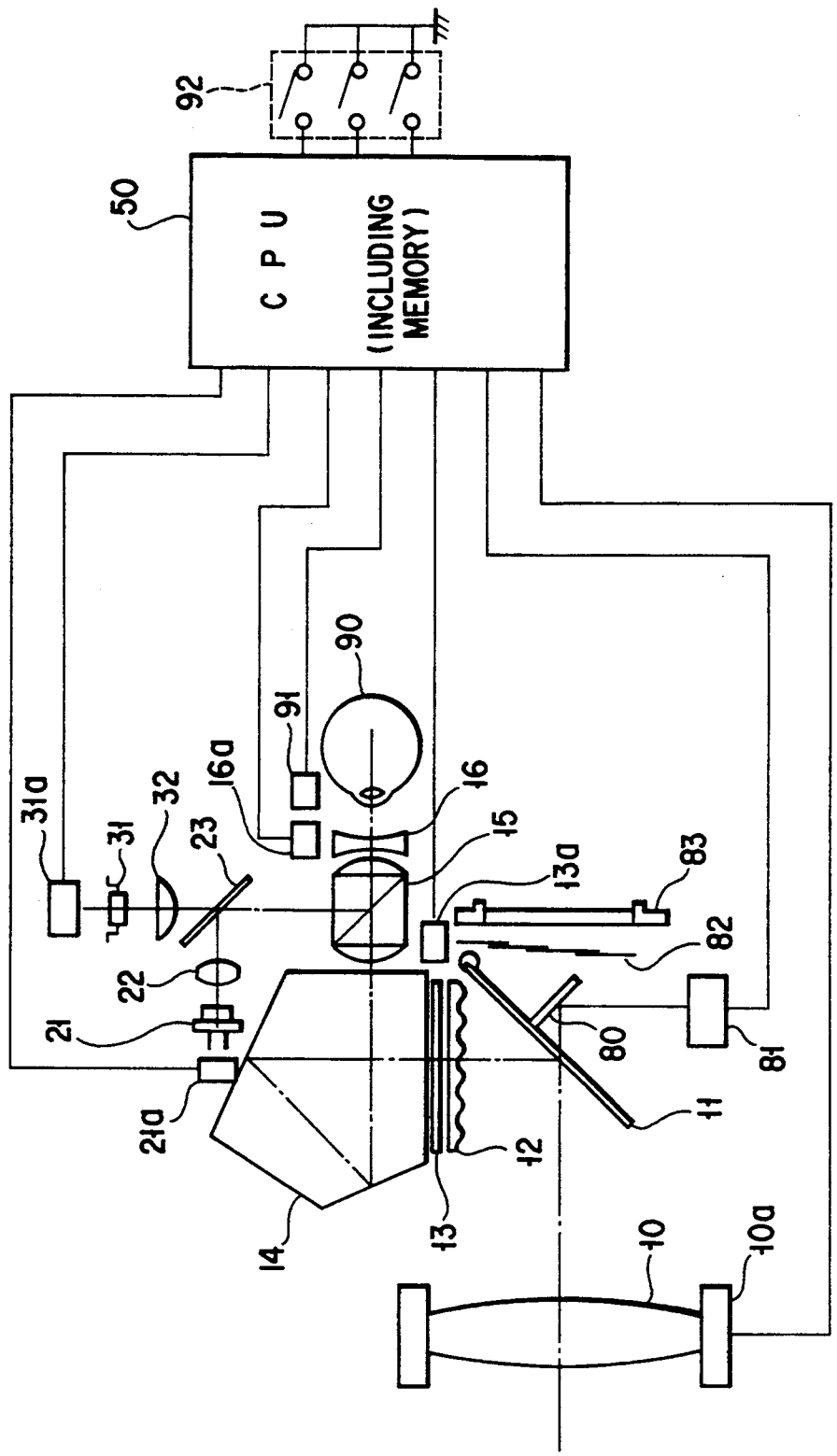
FIG. 2 is a view showing the arrangement of a modification of the first embodiment.

The principle of visual line direction detection which is applied to the present invention will be described first prior to describing embodiments of the present invention. Although various techniques for visual line direction detection can be presented, only a technique of detecting the visual line direction of a user by using a Purkinje image and a reflected image of the fundus or an edge of the iris will be described as a technique which can be applied to a camera.

The eyeball of a man generally has the structure shown in FIG. 11.

When light 95 is incident on an eyeball 90, the light 95 is reflected by respective interfaces: a cornea front surface 91, a cornea rear surface 91', and front and rear surfaces 93' and 93" of a crystalline lens 93. Images formed by reflection of these surfaces are generally known as Purkinje images. More specifically, the images formed by reflection at the cornea front surface 91, the cornea rear surface 91', and the front and rear surfaces 93' and 93" of the crystalline lens 93 are respectively called the first Purkinje image, the second Purkinje image, the third Purkinje image, and the fourth Purkinje image.

A visual line direction detecting device for a camera according to the present invention is designed to detect the visual line of the user by using the first Purkinje image. The first Purkinje image is a virtual image, of a light source, formed by reflected light from the cornea front surface 91, and is also called a cornea reflected image which has the highest light intensity.

FIG. 12 shows the state of a first Purkinje image 95a as such a reflected image.

More specifically, when light is radiated on the eyeball 90, and the resultant reflected images are received, the first Purkinje image 95a having a high light reception output is detected. It is difficult to detect other Purkinje images than the first Purkinje image 95a because they are small in reflected light amount and the reflected images are formed at different positions.

In addition, when the light is radiated on the eyeball 90, a fundus image formed by reflected light 95b from a fundus (retina) 94 is detected as a silhouette of a peripheral edge 92' of the pupil. The reflected image 95b from the fundus is shown in FIG. 12 together with the first Purkinje image 95a. The visual line direction of the user is detected by using these two images.

Figures 13A, 13B, 13C:
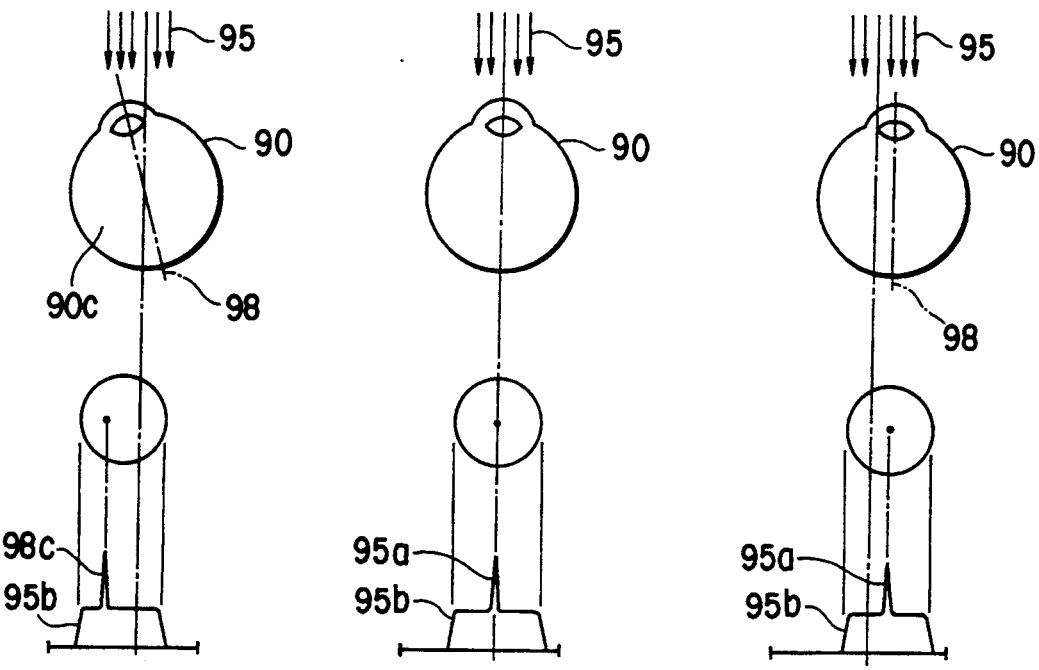
FIG. 13A is a view showing the state of a detection image formed when the eyeball 90 rotates.
FIG. 13B is a view showing the state of a detection image formed when the optical axis of the eyeball 90 is parallel to a beam of light incident on the eye.
FIG. 13C is a view showing the state of a detection image formed when the eyeball 90 moves parallel to a beam of light.
Figure 14:
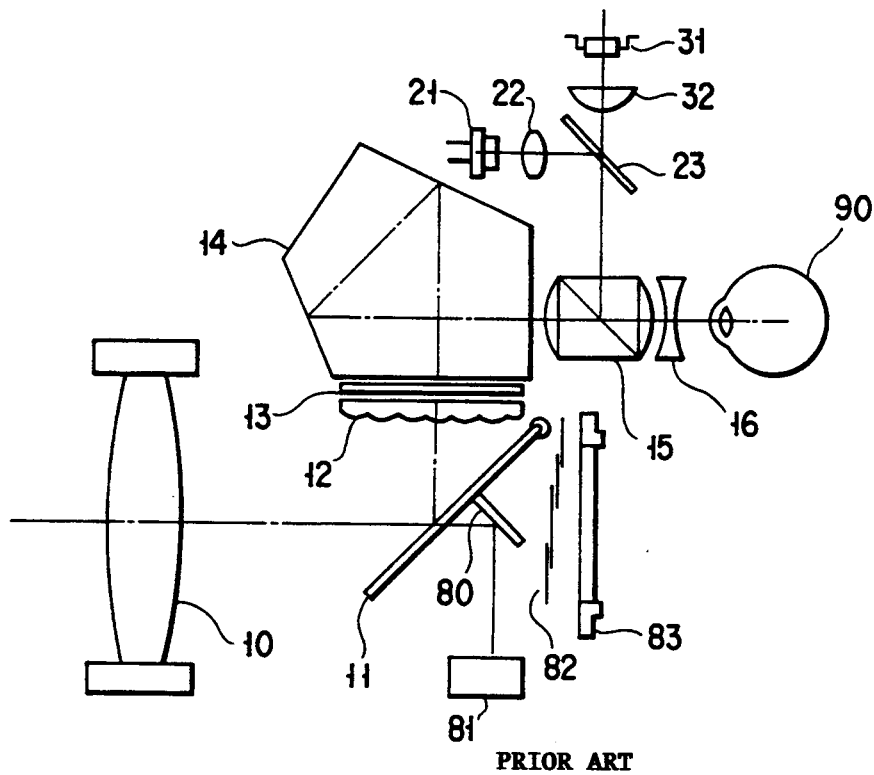
FIG. 14 is a view showing the arrangement of a conventional visual line direction detecting device for a cameras.
Figure 15A:
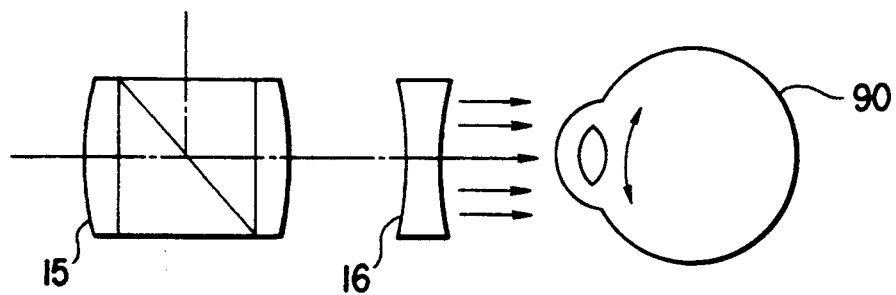
FIGS. 15A and 15B are views for explaining a change in the state of a visual line direction detecting optical system.
Figure 15B:
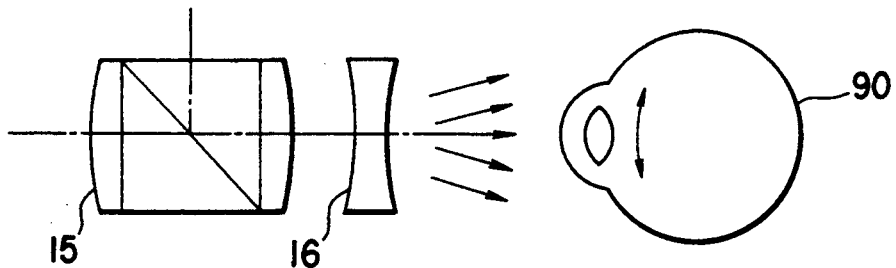
Figure 16:
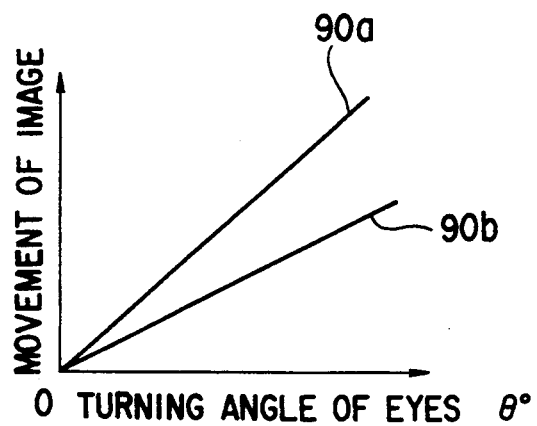
FIG. 16 is a graph showing the relationship between the rotational angle of an eyeball 90 and the movement amount of an image on a light-receiving sensor.

The detected images change upon rotation of the eyeball, as shown in FIGS. 13A to 13C.

More specifically, when a beam of light incident on the eye is parallel to an optical axis 98 of the eyeball 90, the center of the fundus image 95b, i.e. the center of the pupil, coincides with the first Purkinje image 95a, as shown in FIG. 13B.

When the eyeball 90 rotates, the optical axis 98 of the eyeball 90 rotates about a rotation center 90c, as shown in FIG. 13A. In this case, the center of the fundus image 95b is received at different positions on a sensor pixel array for receiving reflected light from the eyeball 90 in the cases shown in FIGS. 13A and 13B. In addition, the center of the first Purkinje image 95a is received at a position different from that of the center of the fundus image 95b. This is because the center of the curved surface of the cornea front surface 91 is different from the rotation center of the eyeball 90.

when the eyeball 90 moves parallel to a beam of light, the two images 95a and 95b move on the sensor pixel array by the same amount, as shown in FIG. 13C.

Therefore, the rotation and shift amount of the eyeball 90 of the user who is looking into the finder can be obtained on the basis of deviations of the absolute positions of the two images with respect to the sensor pixel array and the relative displacement between the two images. In addition, the direction in which the user is looking can be discriminated.

As described above, in the visual line direction detecting device for the camera according to the present invention, the rotation and shift amount of the eyeball of the user who is looking into the finder can be obtained on the basis of deviations of the absolute positions of the two images with respect to the sensor pixel array and the relative displacement between the two images. The direction in which the user is looking can be discriminated on the basis of the shift amount.

Embodiments of the present invention which are based on the above principle will be described next.

As shown in FIG. 1, in the visual line direction detecting apparatus for the camera according to the present invention, a finder optical system 1 is coupled to a visual line direction detecting light-emitting/light-receiving section 2, which, in turn, is coupled to a visual line direction calculating section 3. The finder optical system 1 is coupled to an optical system changing section 5, which is coupled to a state detecting section 7. The state detecting section 7 is coupled to the visual line direction calculating section 3 through a calibration section 6, and an initialization instruction section 4 is coupled to the visual line direction detecting light-emitting/light-receiving section 2, the visual line direction calculating section 3, and the state detecting section 7.

The visual line direction detecting light-emitting/light-receiving section 2 includes an analog/digital converter.

In this arrangement, the visual line direction detecting light-emitting/light-receiving section 2 radiates illumination light on the eyeball of the user through at least part of the finder optical system 1, and receives the light reflected by the eyeball. The visual line direction calculating section 3 then calculates the visual line direction of the user on the basis of an output from the visual line direction detecting light-emitting/light-receiving section 2. The initialization instruction section 4 instructs setting/inputting of an initial visual line position as a reference value for a calculation in the visual line direction calculating section 3.

After this instruction is given, the optical system changing section 5 changes the optical system of the finder optical system 1, as needed. Furthermore, the state detecting section 7 detects the change amount or state of the finder optical system 1 on the basis of an output from the optical system changing section 5 after the initialization input operation performed by the initialization instruction section 4. A calibration section 6 then obtains a correspondence between the visual line direction of the user and the direction or position of the eyeball on the basis of an output from the state detecting section 7, and outputs the resultant data to the visual line direction calculating section 3.

FIG. 2 shows a case wherein the visual line direction detecting device of the present invention is applied to a single-lens reflex camera.

As shown in FIG. 2, a quick return mirror 11 is disposed on the optical path of light transmitted through a photographic lens 10. A screen 12 and a finder liquid crystal display (LCD) 13 are arranged on the optical path of the light reflected by the quick return mirror 11. A pentaprism 14 is disposed on the optical path of the light transmitted through the screen 12 and the finder LCD 13. A prism 15 and an eyepiece 16, both also serving as optical members for visual line direction detection, are arranged on the optical path of the light reflected by the reflecting surface of the pentaprism 14. In addition, a state detecting section 16b for detecting the position information of the eyepiece 16 is arranged on the eyepiece 16.

A sub-mirror 80 is disposed on the optical path of the light transmitted through the quick return mirror 11. An automatic focusing (AF) sensor 81 is disposed on the optical path of the light reflected by the sub-mirror 80. An infrared light-emitting diode (LED) 21 and a light-emitting lens 22 are arranged to constitute a light-emitting means for visual line direction detection. In addition, a light-receiving sensor 31 and a light-receiving lens 32 are arranged to constitute a light-receiving means for visual line direction detection.

An emission control circuit 21a is coupled to the LED 21 of the above-mentioned light-emitting section, whereas an interface circuit 31a is coupled to the light-receiving sensor 31 of the light-receiving section. A driving circuit 13a is coupled to the LCD 13, and a lens driving circuit 10a is coupled to the photographic lens 10. In addition, the device includes a detecting circuit 91 for detecting whether the user is looking into the finder.

The emission control circuit 21a, the interface circuit 31a, the driving circuit 13a, the lens driving circuit 10a, and the detecting circuit 91 are coupled to a central processing unit (to be referred to as a CPU hereinafter) 50. Furthermore, a switch group 92 having a release switch, a mode switch, and the like is coupled to the CPU 50. This CPU 50 includes a memory which store the data, which is outputted from the AF sensor 81 and the interface circuit 31a. Note that reference numeral 82 and 83 in FIG. 2 denote a shutter and a portion of the camera main body, i.e., a film rail surface, respectively.

In this arrangement, light transmitted through the photographic lens 10 is reflected by the quick return mirror 11. The reflected light is then incident on the screen 12 and the finder LCD 13. The contents displayed by the LCD 13 can be seen upon superposing them on an object to be photographed on the screen 12.

The light transmitted through the screen 12 and the finder LCD 13 is reflected by the reflecting surface of the pentaprism 14. The reflected light is then incident on the prism 15 and the eyepiece 16. Furthermore, data associated with the movement amount of the eyepiece 16, obtained by this diopter correction, is input to the CPU 50.

Meanwhile, the light transmitted through the quick return mirror 11 is reflected by the sub-mirror 80. This reflected light is input to the AF sensor 81. Information from the AF sensor 81 is input to the CPU 50 to perform an arithmetic operation for the AF function. The emission control circuit 21a, the interface circuit 31a, the driving circuit 13a, and the lens driving circuit 10a are controlled by the CPU 50 on the basis of the arithmetic operation result for the AF function.

Visual line direction detection will be described below with reference to FIG. 3.

As shown in FIG. 3, light emitted from the infrared LED 21 passes through the light-emitting lens 22 and is reflected by a half mirror 23. The reflected light is then incident on the prism 15 having a lens joined to its portion and is reflected by its reflecting surface on which a dichroic coat for reflecting only infrared rays is formed. As a result, the reflected light emerges as a beam of parallel light from the rear surface of the prism 15. The beam of parallel light is then incident on the eyeball 90 of the user through the eyepiece 16. The light reflected by the eyeball 90 is incident on the prism 15 through the eyepiece 16. The light focused by the prism 15 is reflected again by the reflecting surface of the prism 15 and transmitted through the half mirror 23. The transmitted light is transmitted through the light-receiving lens 32 is focused on the light-receiving sensor 31. As a result, a first Purkinje image is received by the light-receiving sensor 31.

The visual line direction of the user is detected on the basis of the first Purkinje image.

In FIG. 3, reference numeral 100 denotes a finger of the user. When a dial 16b of an operating member is rotated by the finger 100 of the user, the eyepiece 16 moves forward and backward on the optical axis of the finder through a gear train 16c. The user adjusts the diopter in accordance with the eyesight of the user to see an object to be photographed on the screen 12 or an intra-finder display 13 sharply. In addition, the state detecting section 16a outputs a signal, corresponding to the position to which the eyepiece 16 is moved, to the CPU 50. Although FIG. 3 shows a state wherein the position of the eyepiece 16 is detected by using an encoder 16d, the present invention is not limited to this.

Figure 5:
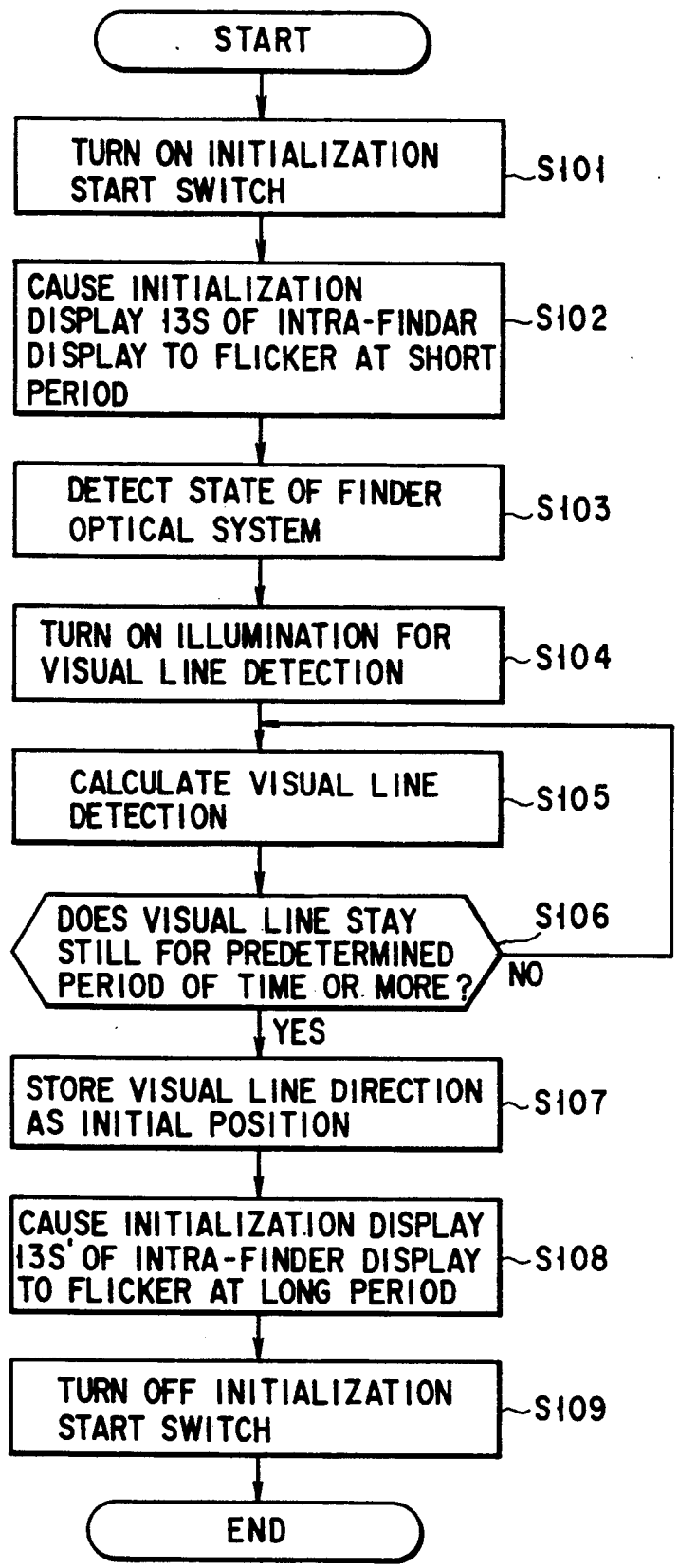
FIG. 5 is a flow chart for explaining an initializing operation.

An initialization operation will be described below with reference to FIGS. 4 and 5.

The user turns on an initialization start switch of the switch group 92 shown in FIG. 2 (step S101). The initialization start switch is a switch for initialization of a visual line direction. The CPU 50 then causes an initialization display 13S of the intra-finder display 13 shown in FIG. 4 to flicker at a short period (step S102). Although this display may be substituted by another intra-finder display, a special display is preferably used for visual line direction detection. Therefore, the flickering period of this display is set to be shorter than that of other displays in order to attract the user's attention. Alternatively, the luminance of the LCD 13 may be increased to obtain the same effect. In this case, it is effective if the remaining finder displays are turned off.

The CPU 50 detects the current state of the finder optical system. That is, the CPU 50 detects the state of the finder optical system in an initialization operation (step S103). In this case, the contents detected by the CPU 50 are, for example, the position or attachment-/detachment information of a lens which is used for adjusting the diopter of the finder optical system and can be arbitrarily changed by the user in a normal operation of the camera.

Subsequently, the CPU 50 sets illumination for visual line direction detection in an ON state to illuminate the eyeball 90 of the user (step S104). The CPU 50 performs a calculation for the visual line direction (step S105). This operation is performed by a technique based on the above-described principle.

The CPU 50 then detects on the basis of information associated with the visual line direction detected in step S105 whether the visual line of the user stays still for a predetermined period of time or more. If the visual line direction of the user stays still for the predetermined period or more, it is detected that the user is watching the display 13S, and the flow advances to step S107 (step S106). Otherwise, it is detected that the eye of the user is not fixed yet, and the flow returns to step S105 again. In step S105, the visual line direction may be detected several times to calculate an average of the detected values, or a position at which the user looks most frequently. In addition, the processing in steps S105 and S106 may be repeated several times to increase the precision.

Subsequently, the CPU 50 stores the visual line direction as initial position information in the internal memory. That is, the CPU 50 stores information associated with the visual line direction, of the user, which corresponds to the display 13S on the finder (step S107). In this case, if the user wants to arbitrarily store such information, he/she may input information with the first release button of the camera or the like at an arbitrary time point.

The CPU 50 prolongs the flickering period of the initialization display 13S to indicate the completion of initialization (step S108). The display 13S may be turned on or turned off instead of causing it to flicker. The input operation is then completed when the user turns off the initialization start switch (step S109).

As shown in FIG. 4, in an initialization operation, not only the display 13S but also a display 13S' may be set so that after initialization at the display position of the display 13S is completed, the processing in steps S102 to S108 described above is repeated at the position of the display 13S'. Furthermore, in order to increase the initialization precision, initialization is preferably performed also at the position of the display 13S. As shown in FIG. 4, initialization correction may be performed with respect to the upward/downward and rightward-/leftward movements of the visual line direction, separately, by setting the display positions of the displays 13S and 13S' to be symmetrical about the center of the screen.

In addition, it is preferable that the size of each initialization display be smaller than the resolution required for visual line direction detection, and that the display have a shape allowing the user to easily watch its center. More specifically, as shown in FIG. 4, a cross-shaped display having corner portions gathering around the center of the display is preferable. If the point of an arrow or the vertex of a triable is set to be an initialization position, the user can easily watch it.

In the above described case, one of the switch group 92 is used as the initialization start switch. However, instead of using such a switch, an output from the detecting circuit 91 for detecting that the user is looking into the finder of the camera may be used in such a manner that an initialization operation is started within a predetermined period of time after the output.

Since the focal depth of the visual line direction detecting optical system is generally large, an image does not blur much on the light-receiving sensor 31. However, in order to perform visual line direction detection with high precision, since a predetermined relationship between the eyeball 90 end a reflected image on the light-receiving sensor 31 must be maintained, the position of the reflected image is important.

Figure 6:
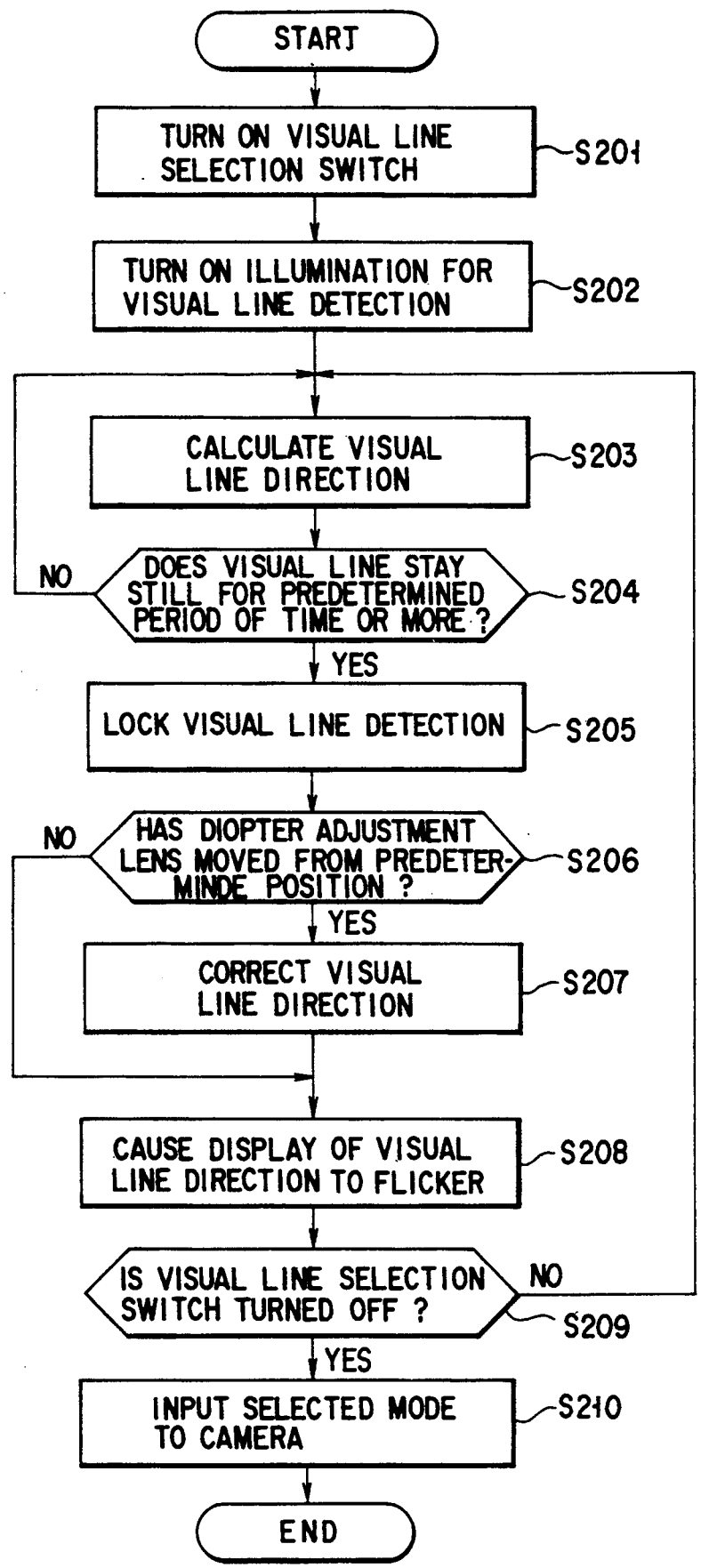
FIG. 6 is a flow chart for explaining an operation of the first embodiment.

An Operation of the embodiment will be described below with reference to the flow chart shown in FIG. 6.

The user turns on a visual line selection switch as an operating member of, the switch group 92 in FIG. 2 (step S201). The visual line selection switch is a switch for starting visual line direction detection. As this switch, a single switch or the release button of the camera may be used. Alternatively, a mode button for performing a switching operation upon inputting of visual line information may be used. Subsequently, the CPU 50 instructs the infrared LED 21 for visual line direction detection to start illumination (step S202). The CPU 50 calculates the visual line direction of the user on the basis of a detected reflected image from the eyeball 90 of the user (step S203).

The CPU 50 checks whether the visual line of the user stays in the detected visual line direction for a predetermined period of time, e.g., 200 ms, or more. If the visual line direction of the user moves within the predetermined period of time, the visual line direction is calculated again (step S204). If the visual line direction of the user stays still for the predetermined period of time or more, the CPU 50 stores the visual line direction in the internal memory (step S205).

Upon obtaining an output from the encoder of the state detecting section 7, the CPU 50 discriminates whether the eyepiece 16 has moved from a predetermined position (step S206). If the eyepiece 16 has moved from the predetermined position, the CPU 50 corrects the visual line direction in accordance with the movement amount or position of the eyepiece 16 (step S207).

If the CPU 50 determines in step S206 that the output from the encoder coincides with the initial value, no correction is performed, and the flow advances to step S208. The CPU 50 causes the display which the user is watching to flicker so as to inform the user that the visual line direction is determined, and the camera is switched to the contents of the display (step S208).

Subsequently, the CPU 50 checks whether the visual line selection switch is OFF (step S209). If the visual line selection switch is ON for a predetermined period of time or more, the CPU 50 repeats the operation of calculating the visual line direction again in step S203. When the user operates the operating member to turn off the switch, the CPU 50 inputs the contents of the finder display to the camera, and completes the operation of performing visual line direction detection (step S210).

As described above, the intended visual line direction of the user can be accurately detected by determining the visual line direction using the output obtained by calculating the visual line direction in step S205 end the output from the state detecting section. Note that the processing to be performed in steps S206 and S207 may be performed in step S203 so that a correct visual line direction can be detected at the end of calculation of the visual line direction.

In the above-described embodiment, the diopter is adjusted by moving the eyepiece 16. However, as a means for adjusting the diopter, a lens externally attached to the finder rear surface, e.g., a diopter adjustment lens, may be used. In this case, a state detecting section may have a predetermined electrical contact for the diopter of each diopter adjustment lens so as to recognize the attachment of a diopter adjustment lens of a specific diopter to the camera when the lens is attached to the camera. In addition, these operations need not be automatically performed in the manner described above, but the user may manually input the state of the finder by switching operating members of the camera.

Figure 7:
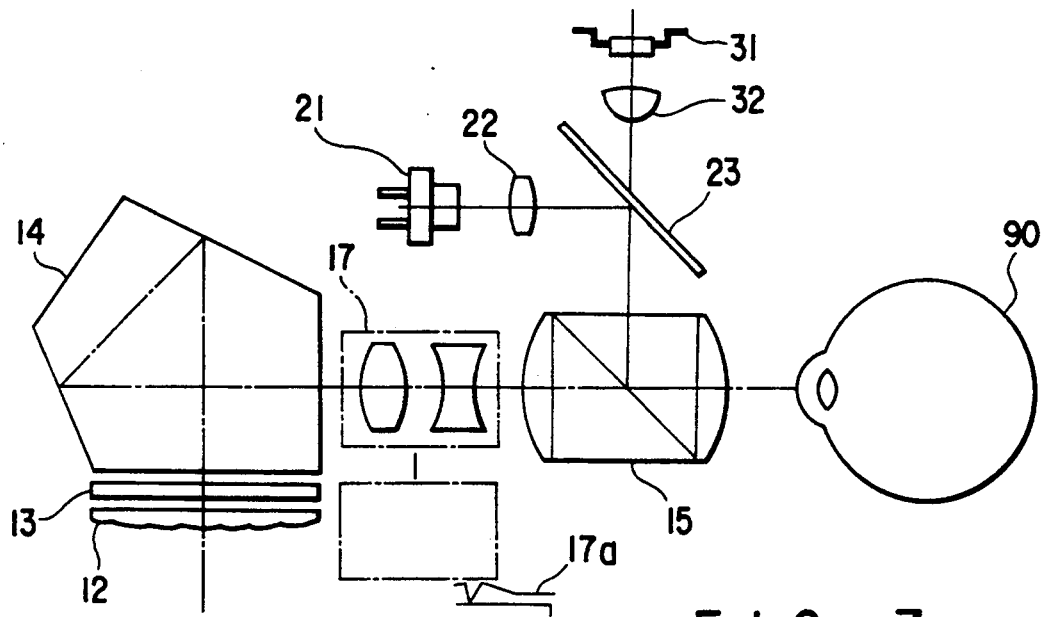
FIG. 7 is a view showing the arrangement of the second embodiment of the present invention.

A visual line direction detecting device for a camera according to the second embodiment of the present invention will be described below. FIG. 7 shows the arrangement of the second embodiment of the present invention. The same reference numerals in the second embodiment denote the same parts as in the first embodiment, and a description thereof will be omitted.

In the second embodiment, a finder variables power lens 17 is arranged in a finder optical path between a pentaprism 14 and a prism 15. The finder variable power lens 17 is designed to be retracted or inserted from or in the finder optical path with a camera operating member of the switch group 92 shown in FIG. 2. The finder variable power lens 17 may be driven by an arbitrary method suitable for the camera, e.g., a mechanical driving method or an electrical driving method using a motor, a gear train, and the like.

Figure 8A:
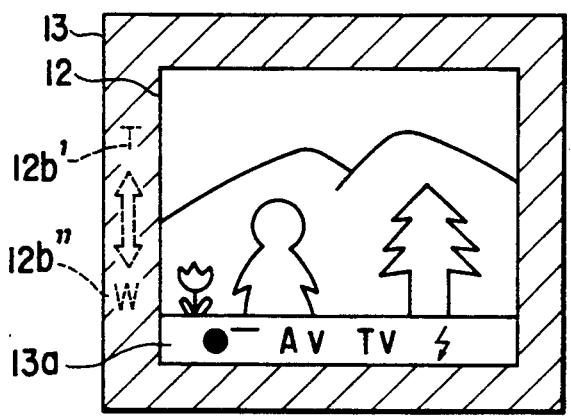
FIG. 8A is a view showing an intra-finder display in a state wherein a finder variable power lens 17 is inserted in a finder optical path.

As shown in FIG. 8A, an object to be photographed and an intra-finder display portion 13a can be seen on a screen 12 as an intra-finder display when the finder variable power lens 17 is arranged in the finder optical path. However, no information is displayed on the hatched portion of the intra-finder display 13 as a transmission type liquid crystal display. In addition, the hatched portion is located outside the finder visual field and hence cannot be seen by the user. When the finder variable power lens 17 is retracted from the finder optical path, a signal from a switch 17a as a state detecting section 7 is turned on, and the ON signal is input to the CPU 50.

Figure 8B:
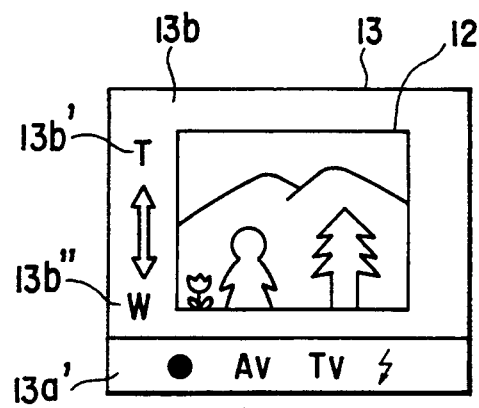
FIG. 8B is a view showing an intra-finder display in a state wherein the finder variable power lens 17 is retracted from the finder optical path.

Subsequently, as shown in FIG. 8B, all the contents of the intra-finder display 13 fall within the finder visual field, and a display 13b can be turned on outside the object on the screen. In this case, the display portion 13a is greatly reduced in size upon reduction in magnification, resulting in difficulty in seeing the display. For this reason, the display position of the display portion 13a is changed to the position of a display 13a' to allow the user to see the same display.

Figure 9:
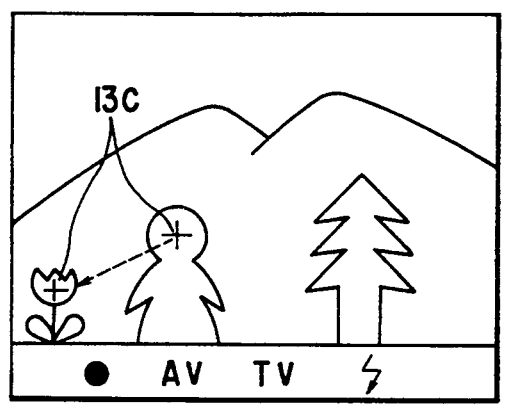
FIG. 9 is a view showing an autofocus target at a position where focusing is performed by an AF sensor 81.

A display 13c in FIG. 9 indicates an AF target at the position at which the camera should be focused by the AF sensor 81 shown in FIG. 2. This AF target 13c is displayed on the intra-finder display in accordance with the visual line direction of the user.

In the AF scheme for adjusting the focus by moving the AF target 13c in accordance with the visual line direction, a known active AF light-emitting system may be moved in accordance with an AF target on the finder. Alternatively, an area type AF unit capable of performing an AF operation of most portions of the screen at arbitrary positions by a known passive AF scheme may be used.

Note that zooming of the photographic lens may be performed by directing the visual line direction of the user to the display 13b in FIG. 8B.

For example, when the user watches a display 13b', a zooming operation is performed toward the telephoto mode (TELE) side, whereas when the user watches a display 13bΔ, a zooming operation is performed toward the wide-angle mode (WIDE) side. This operation can be realized by outputting a signal to the control section of the photographic lens so as to drive the lens toward the TELE or WIDE side in accordance with the visual line position. In this case, a problem is posed when the manner in which a display is seen is changed. For example, the positions of the displays 13b' and 13b'' in FIG. 8B correspond to the positions of displays 12b' and 12b'' in FIG. 8A, and the position of the AF target of the display 13c in FIG. 9 corresponds to the position of the display 13b'' in FIG. 8B.

When, therefore, the manner in which a display is seen is switched by using the finder variable power lens 17, even if the visual line direction detecting optical system is not changed, the position of a display subjected to visual line direction detection is changed. As a result, correct visual line direction detection cannot be performed.

In this embodiment, the above problem is solved by the following operation, thus performing correct visual line direction detection.

A visual line direction detecting operation performed by the second embodiment will be described below with reference to the flow chart shown in FIG. 10.

When the user turns on the visual line selection switch as an operating member of the switch group 92 shown in FIG. 2 (step S310), the CPU 50 instructs an infrared LED 21 for visual line direction detection to start illumination (step S302).

Subsequently, it is detected on the basis of a signal from the state detecting section 17a whether the finder variable power lens 17 is inserted or retracted in or from the finder optical path (step S303).

If it is determined in step S303 that the finder variable power lens 17 is retracted, the CPU 50 changes the intra-finder display 13 to the state shown in FIG. 8B (step S304). The CPU 50 then calculates the visual line direction (step S305), and checks whether the visual line stays at the calculated position for a predetermined period of time, e.g., 200 ms, or more. If the time during which the visual line has stayed still is less than the predetermined period of time, the CPU 50 performs the same processing as that in step S305 (step S306). Thereafter, the CPU 50 determines the visual line direction, and instructs to perform display of an AF target (e.g., the AF target display 13c in FIG. 9) (step S307).

The CPU 50 determines on the basis of position information associated with the visual line, which region of an object to be photographed the user is watching (i.e., whether the user wants to display the AF target 13c), or whether the user is watching an intra-finder display (e.g. the display portion 13b in FIG. 8B) (step S308). If it is determined in step S308 that the user is watching the object, the CPU 50 performs display of the AF target 13c (step S309). The CPU 50 corrects the position or movement amount of the calculated visual line direction by an amount corresponding to the reduction ratio of the finder optical system, thus re-calculating the visual line direction in accordance with the visual line direction in the state wherein the magnification of the finder optical system is not reduced (step S310). The CPU 50 then checks whether the user turns off the visual line selection switch. If the switch is turned off, the CPU 50 operates the AF sensor 81 so perform an autofocus operation at the corrected position (step S311).

If it is determined in step S308 that the user is not watching the object, the CPU 50 displays the position which the user is watching (step S313). The CPU 50 then controls the camera in accordance with the contents of the display 13b in the visual line direction of the user (step S312).

If it is determined in step S303 that the finder variable power lens 17 is inserted, the CPU 50 calculates the visual line direction (step S314). The CPU 50 checks whether the visual line stays at that position for a predetermined period of time, e.g., 200 ms, or more. If the time during which the visual line has stayed still is less than the predetermined period of time, the CPU 50 performs the processing in step S314 again (step S315). Thereafter, the CPU 50 determines the visual line direction (step S316), and displays an AF target, e.g., the AF target display 13c in FIG. 9 (step S317), If the user performs visual line selection (step S311), the CPU 50 controls to focus the camera on the object located at the position at which the AF target is displayed (step S312).

In the second embodiment, the displays for the zooming operation of the photographic lens are shown in the display portion 13b, as described above.

As described above, when the state in which the user observes the finder is changed, the CPU 50 determines in step S303 that the contents detected by the visual line are changed, and hence changes the subsequent control, thereby enabling visual line direction detection in any display state. When the visual line is directed to an object seen on the finder, the visual line direction is corrected in accordance with a magnification to realize the following control with respect to the object seen by the user regardless of the position of the object on the finder.

In the second embodiment, the manner in which a display is seen by the user upon observing the finder is changed by using the finder variable power lens 17. However, a variable power lens may be arranged in the photographic lens to change only the magnification of an object seen on the finder screen. In this case, the variable power lens must be retracted from the photographic optical path in a state wherein a film is exposed.

As has been described in detail above, according to the present invention, even if the visual line direction detecting optical system and the finder optical system share the same components, the influence of a change in diopter after an initialization input operation on visual line direction detection can be eliminated. Therefore, the intended visual line direction of the user can be accurately detected, and visual line direction detection need not be repeated many times, providing an easy-to-use camera for the user.

In addition, even if an object to be photographed or a display on the finder is changed with a change in the magnification of the finder optical system, the visual line direction detection processing is changed in accordance with the current state to perform correction in accordance with the change in finder magnification. Hence, visual line direction detection can be performed in any state to realize an easy-to-use camera. In addition, even if a display on the finder is changed in accordance with the state of the finder, visual line direction detection can be performed, and the display contents can be increased in amount. As described above, according to the present invention, there is provided a visual line direction detecting device for a camera, which can perform visual line direction detection in accordance with diopter adjustment, performed after an initialization input operation, and a change in the magnification of the finder optical system.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A visual line direction detecting device comprising:
a finder optical system of a camera;
light-emitting means for radiating light on an eyeball of a user of the camera through at least a portion of said finder optical system;
light-receiving means for receiving light reflected by the eyeball of the user;
storage means for storing an output from said light-receiving means when the user watches a predetermined position on a finder of the finder optical system;
calculating means for calculating the direction in which the user is looking in accordance with outputs from said storage means and said light-receiving means;
detecting means for detecting a change in said finder optical system; and
correcting means for correcting an output from said calculating means when a change in said finder optical system is detected by said detecting means after a storage operation in said storage means.

2. A device according to claim 1, wherein said detecting means detects an amount of change in said finder optical system, and
said correcting means corrects an output from said calculating means in accordance with an output from said detecting means.

3. A device according to claim 1, wherein said detecting means comprises means for detecting that a diopter of said finder optical system is adjusted.

4. A device according to claim 1, wherein said detecting means comprises means for detecting that a magnification of said finder optical system is changed.

5. A visual line direction detecting device comprising:
light-emitting means for radiating light on an eyeball of a user of a camera;
light-receiving means for receiving the light reflected by the eyeball of the user;

an optical system through which at least one of the lights from said light-emitting means and the light reflected by the eyeball of the user passes;

storage means for storing an output from said light-receiving means when the user watches a specific position;

calculating means for calculating the direction in which the user is looking in accordance with outputs from said storage means and said light-receiving means;

detecting means for detecting a change in said optical system; and correcting means for correcting an output from said calculating means when a change in said optical system is detected by said detecting means after a storage operation in said storage means.

6. A device according to claim 5, wherein said detecting means detects an amount of change in said optical system, and said correcting means corrects an output from said calculating means in accordance with an output from said detecting means.

7. A visual line direction detecting device comprising:

eyeball detecting means for detecting at least one of a direction and position of an eyeball of a user of a camera;

calibration means for obtaining a correspondence between the direction in which the user is looking and at least one of the direction and position of the eyeball in accordance with an output from said eyeball detecting means, which is obtained when the user watches a predetermined position;

calculating means for calculating the direction in which the user is looking in accordance with outputs from said eyeball detecting means and said calibration means;

change detecting means for detecting that a calibrated state obtained by said calibration means is changed; and correcting means for correcting an output from said calculating means in accordance with an output from said change detecting means.

8. A device according to claim 7, wherein said calibration means comprises calibrating operation instructing means for instructing a calibrating operation, and display means for performing a display representing a point watched by the user, in a first form, in accordance with an output from said calibrating operation instructing means.

9. A device according to claim 8, wherein said calibration means performs a display of said display means in a second form when the calibrating operation is completed.

10. A visual line direction detecting device comprising:

eyeball detecting means for detecting at least one of a direction and position of an eyeball of a user of a camera:

calibration means for obtaining a correspondence between the direction in which the user is looking and the direction or position of the eyeball in accordance with an output from said eyeball detecting means, which is obtained when the user watches a predetermined position;

change detecting means for detecting that a calibrated state obtained by said calibration means is changed;

calculating means for calculating the direction in which the user is looking in accordance with outputs from said eyeball detecting means, said calibration means, and said change detecting means; and visual line position display means for displaying a visual line position on the basis of an output from said calculating means, wherein said calibration means includes calibrating operation instructing means, and calibrating operation display means for performing a display representing a point watched by the user in accordance with an output from said calibrating operation instructing means, and performing a display representing completion of the calibrating operation when the calibrating operation is completed.

11. A device according to claim 10, wherein a display form of a point watched by the user which is displayed by said calibrating operation display means is different from that of a visual line position displayed by said visual line position display means.

12. A visual line direction detecting device comprising:

light-emitting means for radiating light on an eyeball of a user of a cameras;

light-receiving means for receiving the light reflected by the eyeball of the user;

an optical system through which at least one of the light from said light-emitting means and the light reflected by the eyeball of the user passes;

storage means for storing an output from said light-receiving means when the user watches a specific position;

detecting means for detecting a change in said optical system after a storage operation in said storage means; and calculating means for calculating the direction in which the user is looking on the basis of outputs from said storage means, said light-receiving means, and said detecting means.

13. A visual line direction detecting device comprising:

eyeball detecting means for detecting a direction or position of an eyeball of a user of a camera;

calibration means for obtaining a correspondence between the direction in which the user is looking and the direction or position of the eyeball in accordance with an output from said eyeball detecting means, which is obtained when the user watches a predetermined position;

change detecting means for detecting that a calibrated state obtained by said calibration means is changed; and calculating means for calculating the direction in which the user is looking in accordance with outputs from said eyeball detecting means, said calibration means, and said change detecting means.

14. A device according to claim 13, wherein said calibration means comprises calibrating operation instructing means, and display means for performing a display representing a point watched by the user, in a first form, in accordance with an output from said calibrating operation instructing means.

15. A device according to claim 14, wherein said calibration means performs a display of said display means in a second form when the calibrating operation is completed.

16. A visual line direction detecting device comprising:
- light-emitting means for radiating light on an eyeball of a user of a camera;
- light-receiving means for receiving the light reflected by the eyeball of the user;
- an optical system through which at least one of the light from said light-emitting means and the light reflected by the eyeball of the user passes;
- detecting means for detecting a change in said optical system;
- calculating means for calculating the direction in which the user is looking on the basis of an output from said light-receiving means; and
- correcting means for correcting an output from said calculating means in accordance with an output from said detecting means.

17. A device according to claim 16, wherein said detecting means performs an output operation in accordance with a focal length of said optical system.

18. A visual line direction detecting device comprising:
- a finder optical system capable of changing at least a portion of an optical system;
- detecting means for detecting a state of said finder optical system;
- light-emitting means for radiating light on an eyeball of a user who looks into a finder of the finder optical system:
- light-receiving means for receiving the light reflected by the eyeball of the user;
- calculating means for calculating the direction in which the user is looking on the basis of an output from said light-receiving means; and
- correcting means for correcting an output from said calculating means in accordance with an output from said detecting means.

19. A device according to claim 18, wherein said detecting means performs an output operation in accordance with a magnification of said optical system.

20. A visual line direction detecting device comprising:
- light-emitting means for radiating light on an eyeball of a user of a camera;
- light-receiving means for receiving the light reflected by the eyeball of the user;
- an optical system through which at least one of the light from said light-emitting means and the light reflected by the eyeball of the user passes;
- detecting means for detecting a change in said optical system;
- calculating means for calculating the direction in which the user is looking on a basis of an output from said light-receiving means; and
- means for adjusting the calculated direction in accordance with the detected change in said optical system.

21. A device according to claim 20, wherein said detecting means performs an output operation in accordance with a focal length of said optical system.

22. A visual line direction detecting device comprising:
- a finder optical system capable of changing at least a portion of an optical system;
- detecting means for detecting a state of said finder optical system;
- light-emitting means for radiating light on an eyeball of a user who looks into a finder of the finder optical system;
- light-receiving means for receiving the light reflected by the eyeball of the user;
- calculating means for calculating the direction in which the user is looking on a basis of an output from said light-receiving means; and
- means for adjusting the calculated direction in accordance with a change in said optical system.

23. A device according to claim 22, wherein said detecting means performs an output operation in accordance with a magnification of said optical system.

24. A visual line direction detecting device comprising:
- finder optical system;
- visual line direction detection light-emitting/light-receiving means for radiating illumination light on an eyeball of a user of a camera through at least a portion of said finder optical system, and receiving the light reflected by the eyeball to perform photoelectric conversion;
- visual line direction calculating means for calculating the direction in which the user is looking on the basis of an output from said light-receiving means;
- setting means for setting an initial visual line position as a reference for a calculation performed by said visual line direction calculating means;
- optical system changing means for changing an optical state of said finder optical system;
- state detecting means for detecting a change state of said optical system changing means after a setting operation is performed by said setting means; and
- correcting means for correcting a calculation performed by said visual line direction calculating means on the basis of an output from said state detecting means.

25. A device according to claim 24, wherein said optical system changing means comprises means for changing a focal length of said finder optical system.

26. A device according to claim 24, wherein said optical system changing means comprises means for inserting/removing a correction lens in/from said finder optical system.

27. A visual line direction detecting device comprising:
- a finder optical system;
- visual line direction detection light-emitting/light-receiving means for radiating illumination light on an eyeball of a user of a camera through at least a portion of said finder optical system, and receiving the light reflected by the eyeball to perform photoelectric conversion:
- visual line direction calculating means for calculating the direction in which the user is looking on the basis of an output from said light-receiving means;
- setting means for setting an initial visual line position as a reference for the calculation performed by said visual line direction calculating means:
- diopter correction optical system inserted in said finder optical system:
- detecting means for detecting attachment/detachment of said correction optical system after a setting operation performed by said setting means; and
- correcting means for correcting the calculation performed by said visual line direction calculating means on the basis of an output from said detecting means.

28. A camera having a visual line direction detecting device for detecting a visual line direction in a finder, comprising:
    means for correcting a diopter of said finder;
    setting means for setting an initial visual line position;
    calculating means for calculating the visual line direction of a user who looks into said finder after an initialization input is performed by said setting means;
    means for detecting a correction degree of the diopter; and
    correcting means for correcting the calculation performed by said calculating means on the basis of an output from said detecting means.

29. A camera having a visual line direction detecting device for detecting a visual line direction in a finder, comprising:
    optical system changing means for changing an optical state of a finder optical system;
    setting means for setting an initial visual line position;
    calculating means for calculating a visual line direction after an initialization input operation is performed by said setting means;
    state detecting means for detecting a state of optical change in said optical system; and
    correcting means for correcting the calculation performed by said calculating means on the basis of an output from said state detecting means.

* * * * *